(12) United States Patent
Theile et al.

(10) Patent No.: US 9,235,541 B2
(45) Date of Patent: *Jan. 12, 2016

(54) READER WITH SWAPPABLE POWER/COMMUNICATION MODULE

(71) Applicant: Cognex Corporation, Natick, MA (US)

(72) Inventors: Horst Theile, Roetgen (DE); Richard Reuter, Würselen (DE)

(73) Assignee: COGNEX CORPORATION, Natick, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/932,089

(22) Filed: Jul. 1, 2013

(65) Prior Publication Data

US 2014/0131449 A1    May 15, 2014

Related U.S. Application Data

(63) Continuation of application No. 12/572,316, filed on Oct. 2, 2009, now Pat. No. 8,474,724.

(51) Int. Cl.
*G06K 19/00* (2006.01)
*G06F 13/38* (2006.01)
*G06K 7/10* (2006.01)

(52) U.S. Cl.
CPC .......... *G06F 13/385* (2013.01); *G06K 7/10544* (2013.01); *Y02B 60/1228* (2013.01); *Y02B 60/1235* (2013.01)

(58) Field of Classification Search
USPC .................................................. 235/472.02
See application file for complete search history.

(56) References Cited

U.S. PATENT DOCUMENTS

| | | |
|---|---|---|
| 5,218,187 A | 6/1993 | Koenck et al. |
| 5,258,604 A | 11/1993 | Behrens et al. |
| 5,331,136 A | 7/1994 | Koenck et al. |
| 5,410,141 A | 4/1995 | Koenck et al. |
| 5,567,925 A | 10/1996 | Koenck et al. |
| 5,675,139 A | 10/1997 | Fama |
| 5,805,416 A | 9/1998 | Friend et al. |
| 6,115,678 A | 9/2000 | Lieb et al. |
| 6,431,451 B1 | 8/2002 | Koenck et al. |
| 6,877,663 B2 | 4/2005 | Kelly et al. |
| 6,910,632 B2 | 6/2005 | Koenck et al. |
| 7,312,759 B2 | 12/2007 | Kinney et al. |

(Continued)

FOREIGN PATENT DOCUMENTS

EP    0656600    6/1995

OTHER PUBLICATIONS

PCT International Search Report and Written Opinion, Application No. PCT/US2010/051077, Dec. 30, 2010.

*Primary Examiner* — Matthew Mikels

(57) ABSTRACT

A power/communication kit for use with a reader module where the code reader module includes a reader connector and a reader housing, the power/communication kit comprising a plurality of different power/communication modules wherein each module communicates via a different communication protocol and each includes a power source and a communication component suitable for communicating via an associated communication protocol, wherein, each of the modules is securable to the reader module in a similar fashion such that any one of the power/communication modules can be swapped for any other of the power/communication modules so that the reader can be used with different communication systems.

20 Claims, 10 Drawing Sheets

(56) References Cited

U.S. PATENT DOCUMENTS

| | | | |
|---|---|---|---|
| 8,474,724 B2 * | 7/2013 | Theile et al. | 235/472.01 |
| 2005/0087603 A1 | 4/2005 | Koenck et al. | |
| 2008/0123262 A1 | 5/2008 | Coleman et al. | |
| 2008/0217411 A1 | 9/2008 | Ledwith et al. | |
| 2010/0096151 A1 | 4/2010 | Ostling | |

* cited by examiner

READER WITH SWAPPABLE POWER/COMMUNICATION MODULE

CROSS-REFERENCE TO RELATED APPLICATIONS

This application is a continuation of U.S. patent application Ser. No. 12/572,316, titled "Reader with Swappable Power/Communication Module," filed on Oct. 2, 2009, the entire contents of which is incorporated herein by reference.

STATEMENT REGARDING FEDERALLY SPONSORED RESEARCH OR DEVELOPMENT

Not applicable.

BACKGROUND OF THE INVENTION

1. Field of the Invention

The present invention relates to hand held image based ID code readers and more particularly to an assembly that includes a single imaging module that can be used with any of several different power/communication modules so that the imaging module can be used in any of several different applications.

2. Description of the Related Art

Images acquired for code reading, also known as direct part mark ("DPM") or label-based identification, include one or more 1D (e.g., a barcode) or 2D (e.g., a Data Matrix code) symbols located on an object. The code reading process includes repeatedly introducing an object marked with either 1D or 2D codes within a field of view of an image acquisition sensor (e.g., CMOS camera, CCD, etc.), illuminating the codes, and acquiring images, i.e., image data, containing the codes. Each code contains a set of predetermined patterns from which an attached data processor, such as a computer, can derive useful information about the object (e.g., serial number, type, model, price, etc.).

The handheld ID code reader can be connected to a server or remote processor via a network to exchange code reading results, images, as well as reader setup and reader status information. This connection can be facilitated via several different interfaces. For instance, exemplary interface options include a tether which includes a cable and a power source or a wireless interface that uses RF for data transition and energy storage devices (e.g., rechargeable batteries) as a power source. When a reader is to be used generally in one area, a tethered interface may be employed and, where an interface is to be used in many different and disperse locations, a wireless interface may be employed.

In addition to requiring either wireless or tethered interfaces, different systems often require different communication protocols and reader interfaces. For instance, some systems may require a reader to communicate via any one of RS232, Bluethooth, USB, PS2, Ethernet, RS485, etc. Here, if a reader includes an RS232 interface, that reader cannot be used with a system that communicates via one of the other interface types (e.g., USB, Ethernet, etc.). Thus, if a facility installs a new system that communicates via USB or some other interface type, the RS232 reader could not be used in the new system. Similarly, if a reader is configured to communicate via a tether and Ethernet and a facility upgrades the communication system to wireless Bluetooth, the reader cannot be used with the new system.

One solution to the above problem would be to provide a reader that is equipped to communicate via any of the possible types of interfaces. While this solution would provide a versatile reader, there are several shortcomings to this solution. First, with respect to Ergonomics, having a high number of interfaces requires a reader to have a connector with a high number of contacts. A multi-interface connector can only reasonably be placed at the bottom side of a reader handle. More contacts increase the size of the connector and the handle size/diameter. Due to ergonomic constraints there is a limit on handle size. In addition, more interface contacts would require more wires inside a tethered cable resulting in higher cable weight and lower flexibility making it difficult to easily move the reader. Moreover, for the majority of practical applications, only one interface is desired at a time.

With respect to power requirements, the intention of a wireless reader with RF communication is that it operates without any cables. This requires a battery to power the device. Because of the relative high power consumption of an image based ID reader the operating time is limited by the battery capacity. This makes it necessary to have a rechargeable battery. A typical interface for a tethered ID readers is RS232, which allows exchanging data serially. RS232 cannot power a device and some kind of external power supply (e.g. wall adapter) is necessary to power the reader. In contrast, other interfaces like PS2, USB and Ethernet (Power Over Ethernet (POE)) are capable of providing enough power for an attached reader. Some protocols, especially USB and POE have complex power management requirements like start-up current limitations, power sequencing and classification, and low power mode. An extremely complex interface assembly would be required to support all of the possible communication protocols currently in use.

With respect to electronics for each of the interface types, different interface types communicate using different signal levels and have different requirements in terms of signal speed and quality. Multiplexing different interface signals to a limited number of connector pins would require a huge technical effort and is not practicable in a cost and size reasonable way. In addition, electronic parts could be damaged if an error occurs and a multiplexer is set to a wrong connection type. Moreover, all contacts with external connections must be protected against electro static discharge (ESD). Because of the different signal levels and high speed requirements associated with different interface types, a one for all protection circuit is not optimal for all interface types.

DETAILED DESCRIPTION OF THE INVENTION

Figure 8:
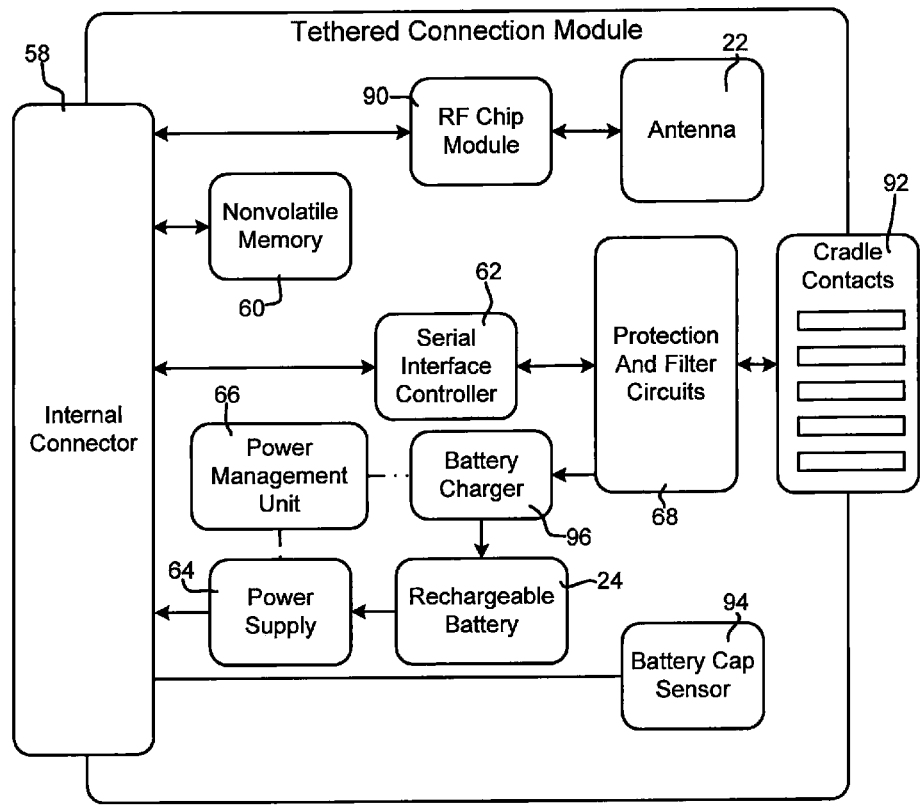
FIG. 8 is a view similar to the view of FIG. 4, albeit showing components in an exemplary wireless power/communication module.

Referring now to the drawings wherein like reference numbers correspond to similar elements throughout the several views, a reader kit 10*a*, 10*b* is illustrated that includes a single reader module 12 and a plurality of different power/communication modules 14*a*, 14*b* (only two power/communication modules shown). As shown, module 14*a* is a tethered module that includes a cable 18 for receiving power and for communicating data back and forth between the reader module 12 and an external computer 20. Module 14*b* includes an antenna 22 (see FIG. 8) and a rechargeable battery 24 so that when module 14*b* is secured to reader module 12, the assembly can be used in a wireless and untethered fashion.

Figure 2:
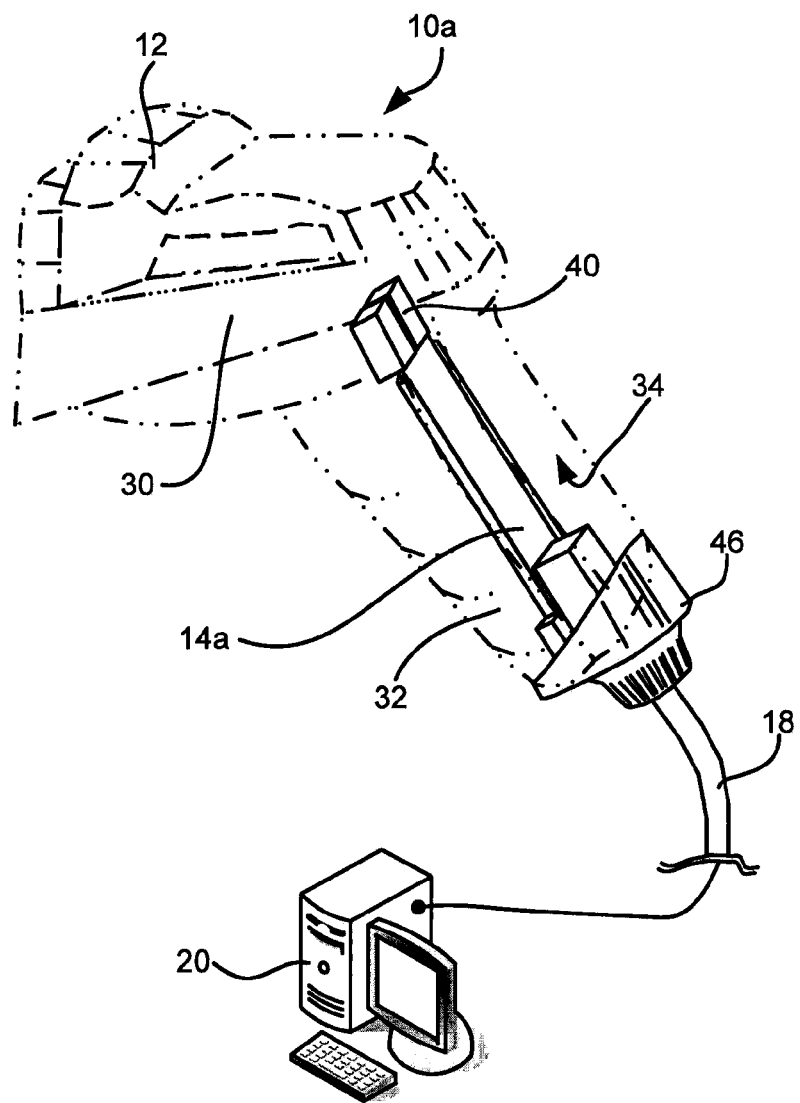
FIG. 2 is a perspective view of the reader of FIG. 1 with a reader module in phantom and a power/communication module in solid line.
Figure 3:
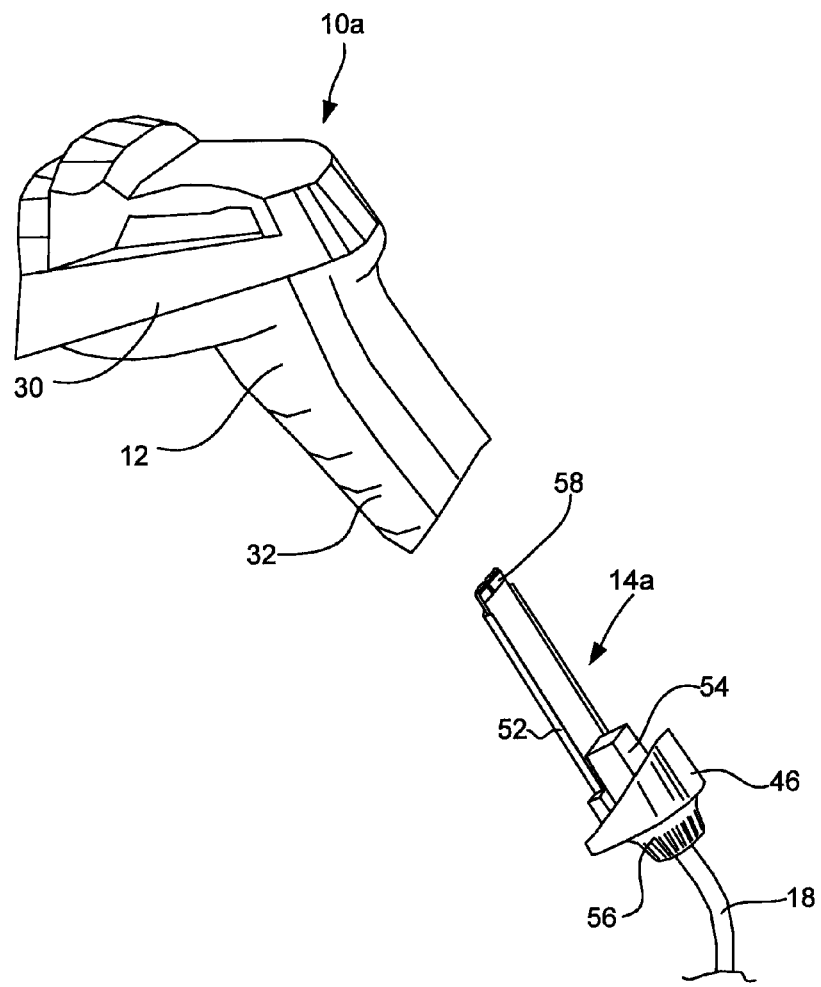
FIG. 3 is a perspective view of the reader in FIG. 1 where the power/communication module has been disconnected.

The general support and housing structures for each of the tethered and wireless modules is similar and therefore, that structure will only be described once in the context of the tethered embodiment illustrated in FIGS. 2 and 3.

Figure 7:
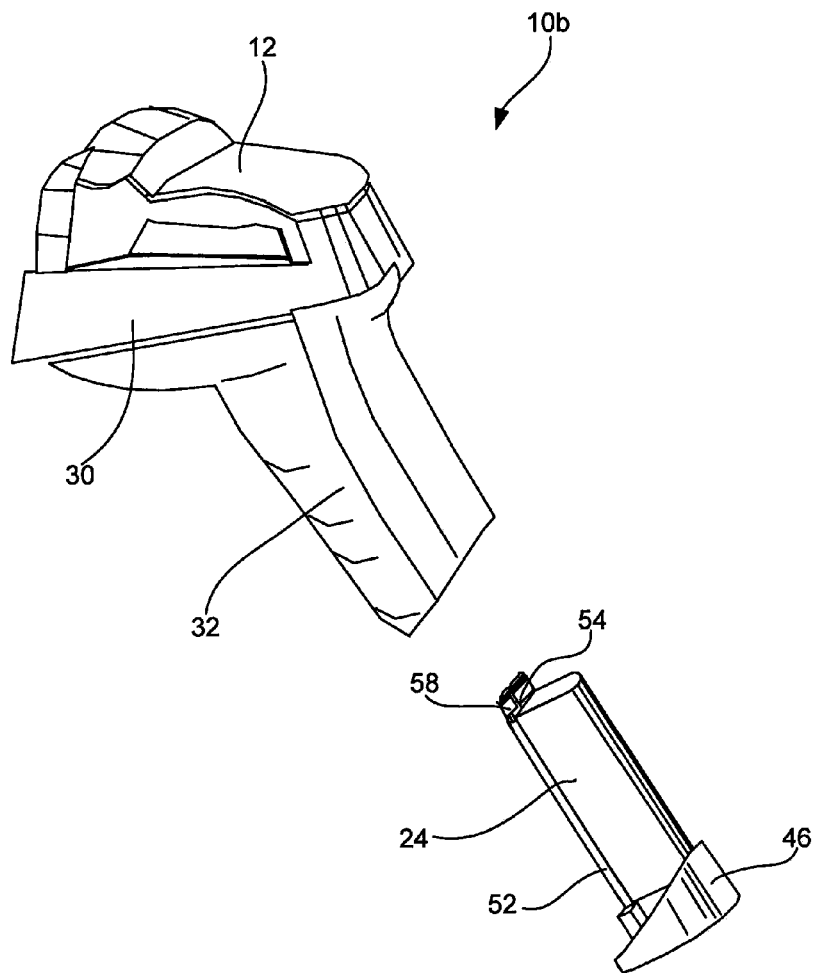
FIG. 7 is a view similar to the view in FIG. 3, albeit showing the wireless power/communication module of FIG. 5.

Referring specifically to FIG. 2, reader module 12 includes a housing structure 28 that includes a barrel portion 30 and a handle portion 32. An imaging assembly (not illustrated) including an image sensor, lenses, illumination devices, a processor, a memory, etc., is located in barrel portion 30. A cavity 34 is formed in handle portion 32 where an opening (at the bottom of the handle portion) is formed that opens into the cavity 34. A reader connector 40 resides at the top end of the cavity 34 and forms a receiving channel (not illustrated) for receiving a power/communication module connector 58 (see FIG. 3 or FIG. 7) when a module 14*a* or 14*b* is inserted into the cavity 34.

Figure 1:
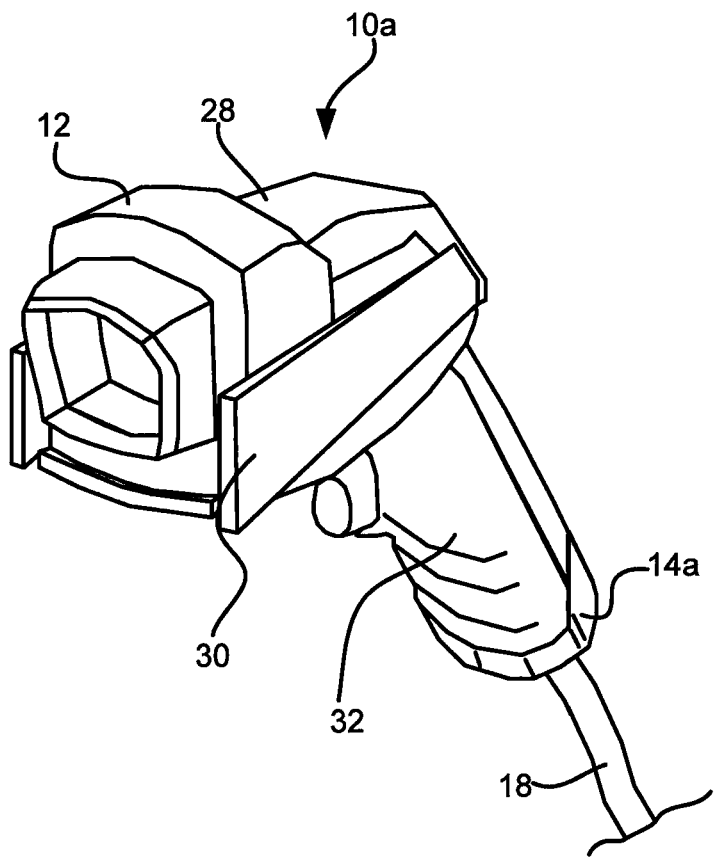
FIG. 1 is a perspective view of a tethered reader according to one embodiment of the present invention.

Referring still to FIGS. 2 and 3, module 14*a* includes a module support structure 46 in the form of an end cap that compliments the opening at the bottom of the handle cavity 32. Although not illustrated, it is contemplated that there will be some type of mechanical fastening mechanism (e.g., one or more screws, a compression securement, tabs and associated receiving holes, etc.) for securing structure 46 at the end of the cavity as shown in FIGS. 1 and 2.

Tethered Modules

Figure 4:
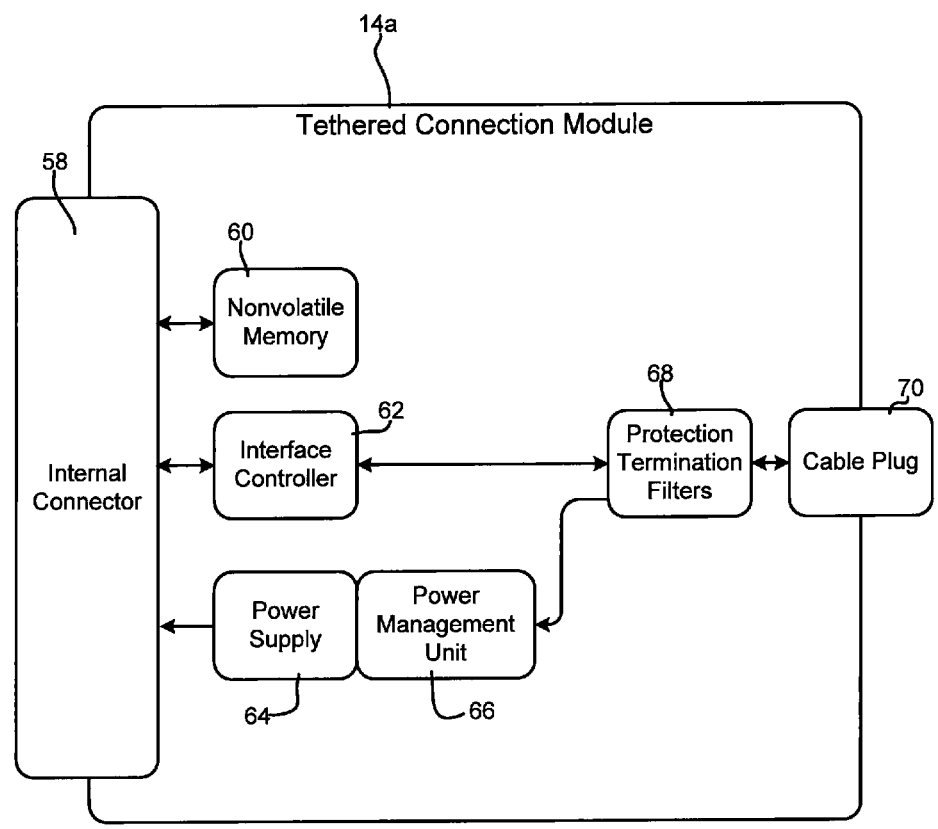
FIG. 4 is a schematic showing the components that from the power/communication module of FIG. 3.
Figure 5:
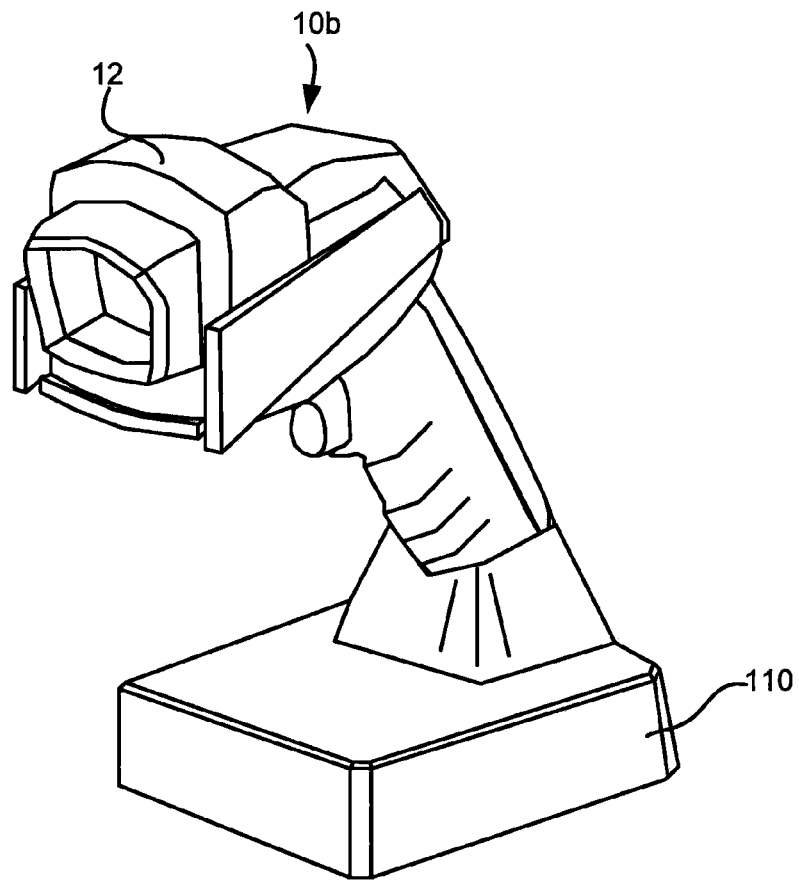
FIG. 5 is similar to FIG. 1, albeit illustrating a wireless power/communication module in a cradle.

Referring to FIG. 3, the exemplary tethered module 14*a* includes a PCB board 50, a board cover 52, a cable plug 54, a cable lock 56 and a module connector 58. Although not illustrated, circuitry is mounted to board 50. Referring also to FIG. 4, the circuitry includes a non-volatile memory 60, an interface controller 62, a protection termination circuit/filter 68, a cable plug 70, a power supply 64 and a power management unit 66. The cable plug 68 provides a mechanical keying feature that ensures that only a matching cable (e.g., USB, Ethernet, etc.) can be plugged in to the module 14*a*. Alternatively, "electrical keying" might be possible as well, but the effort compared to mechanical keying is higher.

Protection circuit 68 secures reader electronics against over current, over voltage, electrostatic discharge (ESD) and reverse polarity. Electro magnetic emissions (EMI) are attenuated by filter 68 and signal integrity is ensured by adequate line termination. The interface controller 62 contains the physical layer of the interface module 14*a* providing data translation and signal integrity between reader data signals and cable interface signals. Non-volatile memory contains a communication module ID and may also contain interface setup information like a MAC address. Power supply 64 is optimized for voltages corresponding to a specific one of several different types of power/communication modules. In this regard, see table 1 below that indicates specific operating parameters for different types of tethered power/communication modules contemplated by the present disclosure. Here, it should be appreciated that there are other tethered communication protocols and that any existing or future protocol could be used with the present disclosure.

TABLE 1

| Communication Interface | Used for | Power |
|---|---|---|
| RS232 | Serial communication | Wall adapter Desktop power supply Typ. +5 . . . +12 VDC |
| USB | HID (HID) USB serial (CDC) Etc . . . | Powered by USB host or USB hub +5 VDC |
| PS2 | Keyboard Emulation Keyboard wedge | Powered by Host +5 VDC |
| Ethernet | Various Ethernet protocols | POE (Power over Ethernet) Typ. +48 VDC |
| RS485 | PROFIBUS MODBUS, etc | Industrial Typ. +5 V, +24 VDC |
| CAN | CANopen DeviceNet | Industrial Typ. +5 V, +24 VDC |

Some tethered power/communication modules require special power management functions. For example, a USB module has a limited start-up current and low power consumption in a suspend mode of operation. As another example, a detection process must be supported for a power over Ethernet (POE) module. The power management unit 66 controls supply 64 in a manner that is suitable for use with an associated type of power/communication module (e.g., 14*a*, 14*b*, etc.).

Referring again to FIG. 3, module 14*a* may be any of the module types shown in Table 1 or other types. In any case, the module connector 58 and support 46 will be similar while the cable plug 70, memory 60, interface controller 62, circuitry 68, power supply 64 and management unit 66 will be different and will depend on which type of module is used.

It should be appreciated that by swapping one module for another, the communication protocol, cable plug and power management can be modified to suit any tethered communication type.

Wireless Modules

Figure 9:
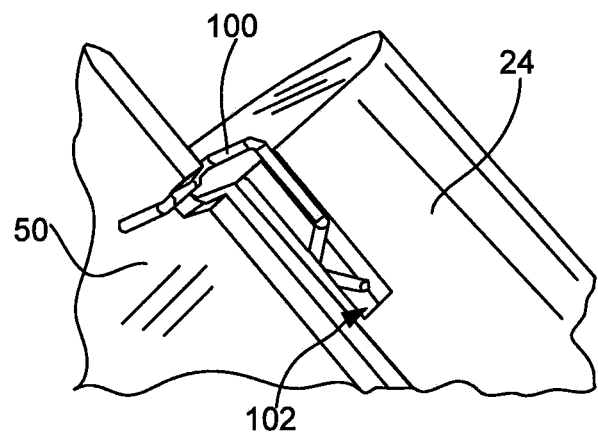
FIG. 9 is a partial perspective view of the module of FIG. 7 showing a clip connector that links a battery to a PCB board.

Referring now to FIGS. 5 through 10, several of the module 14*b* components are similar to the components described above including the reader module 12 that forms cavity 32 and supports the reader connector 40 at the top end of the cavity 32, cover 52 and connector 44. In this case, referring to FIG. 8, PCB board 80 includes several components that are similar to the components described above including the non-volatile memory 60, interface controller 62, protection circuitry and filter 68, power management unit 66 and power supply 64. Additional circuitry in the wireless embodiment of FIG. 8 also includes an RF chip module 90, cradle contacts 9, and battery cap sensor 94. In addition, referring to FIGS. 6 through 8, module 14*b* includes a battery 24, a battery charger 96 (alternatively, the charger can also be part of the cradle interface 110) and an antenna 22. Referring also to FIG. 9, positive and negative (only one shown) clips 100 are mounted to the PCB board 50 and are received in channels (e.g., 102) formed in opposite sides of the battery 24 to make contact with positive and negative battery terminals and to help hold the battery in an installed position.

Referring again to FIG. 8, RF chip/module 90 may be a WiFi module, a Bluetooth module or any other RF technology that facilitates wireless communication with an external computing device (e.g., 20 in FIG. 1). Antenna 22 is optimized for the communication protocol associated with RF chip/module. Non-volatile memory 60 contains a communication module ID and may also contain Interface setup information like a MAC address, Bluetooth ID and speed rate settings for RF communication and a cradle interface 110 (see FIG. 5).

Serial interface controller 62 is a "non RF" interface (e.g. RS232, USB, I2C, SPI) that enables communication when a reader including module 14b is placed in a cradle so that contacts 92 make contact with cradle contacts (not illustrated). Thus, cradle communication as opposed to wireless communication may be supported by at least some kit subassemblies. The contacts 92 (see also FIG. 10) may be used for both power (e.g., for charging the battery 24) and data transmission when the module 14a is received in cradle 110. Protection circuit/filter 68 protects the communication module and the base station against electrostatic discharge (ESD) and over current/over voltage. Filters 68 reduce electro magnetic emissions (EMI).

Figure 6:
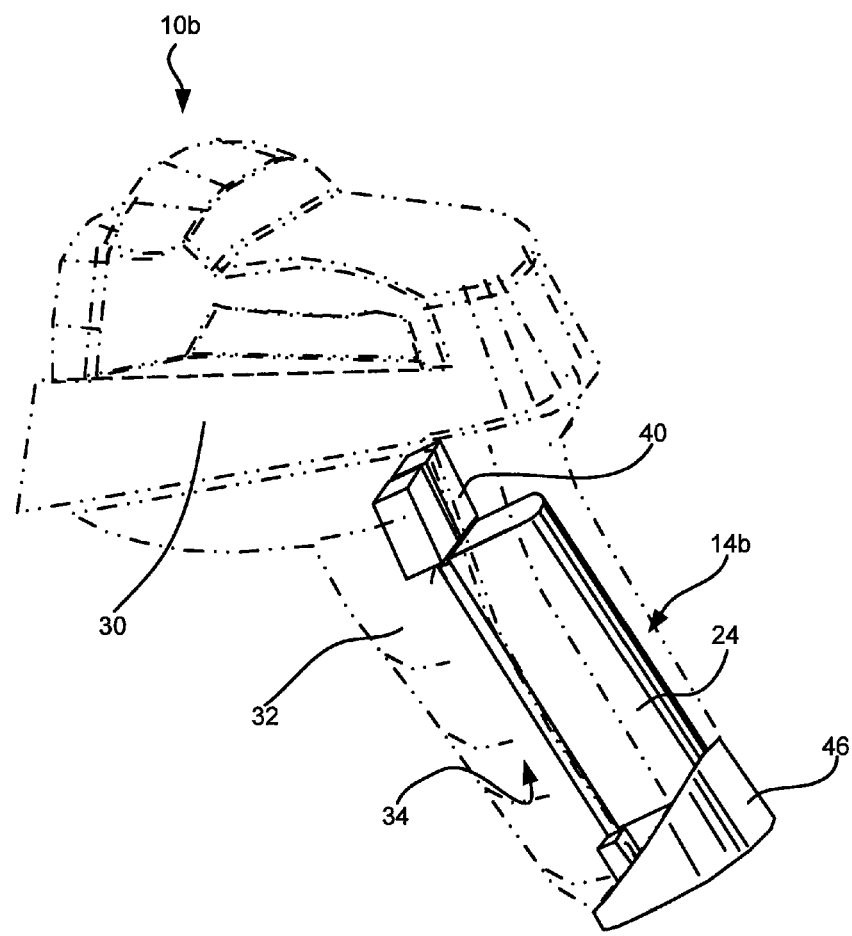
FIG. 6 is a view similar to the view of FIG. 2, albeit showing the wireless power/communication module of FIG. 5.
Figure 10:
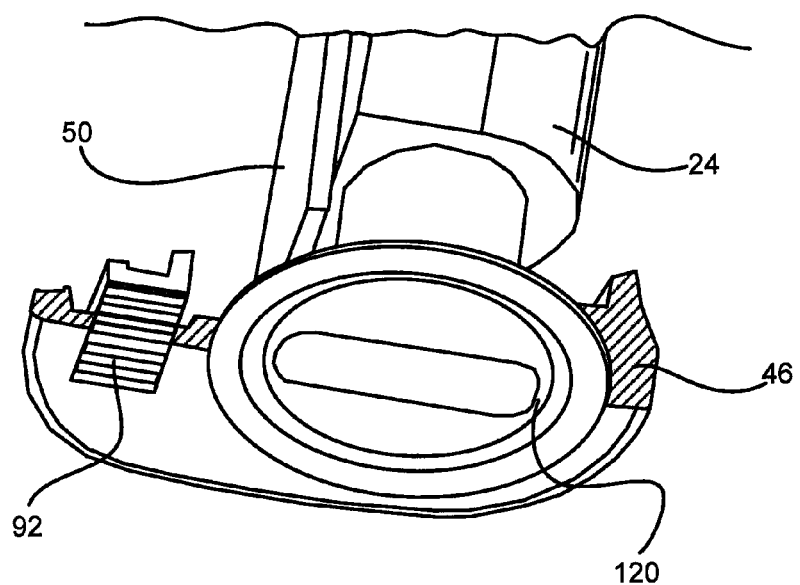
FIG. 10 is a partial perspective view of the module of FIG. 7 showing an end battery cap and adjacent cradle contacts.

Referring to FIG. 10, module 14b includes a support structure 46 that includes a battery cap 120 that can be removed to replace battery 24 without detaching module 14b from reader module 12 (see again FIG. 6). Battery cap 112 is monitored adjacent a sensor (see 94 in FIG. 8) that provides a signal to the reader module 12 when the battery cap is being removed so that the reader can save internal operating data before the battery is finally removed. Battery charger 96 is linked to battery 24 and charges battery 24 when the reader is placed in a cradle 110 as in FIG. 5.

Power management unit 66 includes logic for a device On/Off function and supports power down modes to save battery power. Power down modes may be different for different RF technologies. For instance, while some wireless modules may be able to be powered down, others may need power all the time to keep an RF link alive. Power supply 64 is optimized for battery operating conditions.

Wireless embodiments may include a WiFi module, a Bluetooth module, a wireless USB module, a ZigBee module and a non-RF wireless module (e.g., where information is stored to nonvolatile memory and is transmitted via cradle contacts when a reader is placed into the base station cradle 110.

It should be appreciated that the reader module 12 is essentially identical regardless of which of the tethered or wireless modules 14a, 14b is secured thereto and that any of the tethered or wireless modules may be swapped for any of the other tethered or wireless modules for use with a single reader module. Thus, one advantage of the inventive system is that only one version of the ID reader is required and that the power and communication interface for the reader is easily changeable by the reader user. In addition, any tethered reader type has only a single cable including power and communication cables. Moreover, the system is open for use with different module types that use future interface standards. Furthermore, the system described optimizes power supply and has protection circuitry that is optimized for specific protocols. In addition, interface setup information can be stored to the module memory to facilitate swapping a reader from one power/communication module to another without loosing communication parameters. In addition, sales people only require a single reader with a set of physically small size connection modules to demonstrate all interface options. Moreover, software developers and test engineers can do their work with only a single reader and a set of power/communication modules. Furthermore, defective power/communication modules can easily be repaired by swapping in a different module of the same type. In addition, the swappable design simplifies component stocking. Instead of stocking multiple reader types, the modular concept enables stocking of a kit including a single type of reader module and multiple different types of power/communication modules.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

To apprise the public of the scope of this invention, the following claims are made:

What is claimed is:

1. A removable power/communication module for use with a code reader module where the code reader module includes a reader connector and a reader housing, the reader connector coupled to the reader housing, the power/communication module comprising:
   a power/communication module connector for releasable connection to the reader connector;
   a power supply linked to the module connector for providing power to the reader module via the reader connector;
   a communication component for communicating with an external computing device via an associated communication protocol; and
   an interface controller linked between the module connector and the communication component and programmed to translate data between the communication component and the reader module;
   a module support structure securable to the reader housing and configured to support all of the module connector, power supply, communication component and interface controller such that the module support structure and components supported thereby are removable from the reader module as a single assembly.

2. The removable module of claim 1 further including a non-volatile memory that is linked to the module connector and is supported by the module support structure, the memory including a communication module ID and interface setup information.

3. The removable module of claim 2 wherein the setup information includes at least one of a MAC address, a Bluetooth ID, configuration settings for RF communication and speed rate settings for cradle interface communication.

4. The removable module of claim 1 further including a protection termination circuit linked between the interface controller and the communication component, the termination circuit supported by the module support structure.

5. The removable module of claim 4 further including a filter linked between the interface controller and the communication component for attenuating electo-magnetic emissions.

6. The removable module of claim 4 wherein the protection termination circuit is also linked between the power supply and the communication component.

7. The removable module of claim 1 wherein the communication component includes a cable plug.

8. The removable module of claim 1 wherein the communication component includes cradle contacts.

9. The removable module of claim 1 further including an RF module and an antenna wherein the RF module links the antenna to the module connector.

10. The removable module of claim 8 further including a battery linked to the power supply.

11. The removable module of claim 9 wherein the battery is rechargeable.

12. The removable module of claim 9 further including a battery cap and a cap sensor where the sensor indicates when the battery door is opened.

13. The removable module of claim 1 wherein the reader housing includes a handle that forms a cavity and an opening into the cavity and wherein, when the module support structure is secured to the reader housing, the components supported by the support structure are substantially received within the cavity.

14. A kit comprising a removable power/communication module for use with a code reader module that includes a reader housing and a reader connector coupled to the reader housing, wherein the removable module of claim 1 is a first module that communicates via a first communication protocol and the communication component is a first communication component, the kit includes at least a second removable module that communicates via a second communication protocol and that includes a second communication component, wherein the second removable module is swappable for the first removable module so that the reader can communicate via either of the first and second communication protocols.

15. The kit of claim 14 wherein the first communication component includes a cable plug and the second communication component includes an antenna for wireless communication.

16. The kit of claim 14 further including a plurality of different removable modules where each module includes a unique communication component and communicates via a different communication protocol.

17. A kit including the removable module of claim 1 wherein the kit further includes a reader and a cable.

18. The kit of claim 17 further including at least one power supply.

19. The reader module of claim 1 wherein the power supply is an integrated, interface specific power supply.

20. A code reader module comprising:

a handle portion with a reader connector integrated into the handle portion;

a power/communication module that is removably coupled to the reader connector, the power/communication module comprising:

a power/communication module connector for releasable connection to the reader connector;

a communication component for communicating with an external computing device via an associated communication protocol; and an interface specific power supply linked to the module connector for providing power to the reader module via the reader connector.

* * * * *